United States Patent [19]

Fujinami

[11] Patent Number: 4,770,277

[45] Date of Patent: Sep. 13, 1988

[54] APPARATUS FOR ATTACHING A BRAKE SHOE TO A DISK BRAKE

[75] Inventor: Hideyuki Fujinami, Saitama, Japan

[73] Assignee: Akebono Brake Industry Co., Ltd., Tokyo, Japan

[21] Appl. No.: 942,837

[22] Filed: Dec. 17, 1986

[30] Foreign Application Priority Data

Dec. 20, 1985 [JP] Japan .................................. 60-284512

[51] Int. Cl.4 ............................................. F16D 69/04
[52] U.S. Cl. ................................ 188/244; 188/250 D
[58] Field of Search ...................... 188/73.32, 236, 242, 188/243, 244, 245, 246, 250 D, 250 G

[56] References Cited

U.S. PATENT DOCUMENTS

| 214,623 | 4/1879 | Cristopher | 188/246 |
| 3,435,926 | 4/1969 | Lee | 188/242 |
| 3,957,139 | 5/1976 | Hochhuth et al. | 188/244 |

FOREIGN PATENT DOCUMENTS

| 3990 | of 1883 | United Kingdom | 188/244 |
| 2158531 | 11/1985 | United Kingdom . | |

Primary Examiner—Duane A. Reger
Attorney, Agent, or Firm—Cushman, Darby & Cushman

[57] ABSTRACT

An improvement in mounting brake shoes on disk brakes for railroad cars in which securing member is mounted beneath the open ended groove in the brake assembly to which the shoe is mounted. The securing member moves a predetermined longitudinal distance after being unbolted from the brake assembly, is pivotable relative thereto. The securing member has an anchoring pin protruding therefrom on which a brake shoe may rest as it is being lowered from the brake assembly so that a single person can change a heavy brake shoe without fear of injury.

4 Claims, 5 Drawing Sheets

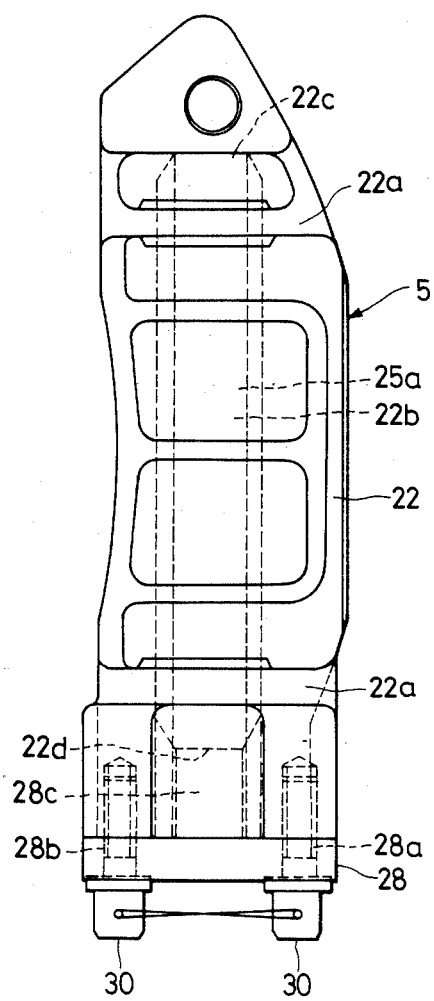

APPARATUS FOR ATTACHING A BRAKE SHOE TO A DISK BRAKE

BACKGROUND OF THE INVENTION

The present invention relates to a device for attaching the brake shoe to a disk brake for a railroad car.

FIGS. 8, 9, 10 and 11 show a conventional disk brake for a railroad car. In the disk brake, a pair of brake levers 1 and 2 are coupled to each other at their halfway portions by coupling rod 6 and pins 3a and 3b so that the brake levers are swingable. An actuator 4 is provided between the ends of the brake levers 1 and 2. Brake shoe assemblies 5 are attached to the other ends of the brake levers 1 and 2 by U-shaped brackets 12a and 12b and coupling pins 13 and 14.

Actuator 4 includes a cylinder 4a, the bottom of which cylinder 4a is coupled to one end of the brake lever 1 by a pin 7. A piston rod 4b similarly is coupled to one end of the other brake lever 2 by a pin 8.

One end of a return spring 9 is coupled to the brake lever 1 by a pin 10. The other end of the return spring 9 is adjustably coupled to the brake lever 2 by a bolt and nut 11 to use together.

The disk brake is attached to the railroad car by supporting the cylinder 4a and the coupling pins 13 and 14 on the chassis 15 of the car. The cylinder 4a is supported by a bracket 16 on the chassis 15.

The upper portions 13a and 14a of the coupling pins 13 and 14 are shaped as forks. Support links 18 and 19 are coupled at their ends to the upper portions 13a and 14a of the coupling pins 13 and 14 and coupled at their other ends to brackets 15a and 15b on the chassis 15. As a result, the brake shoe assemblies 5 are hung from the chassis 15.

Each brake shoe assembly 5 includes a body 22 and a brake shoe 23. The brake shoe 23 includes a back element 25 and a lining 24 secured thereto. As shown in FIG. 11, body 22 has a pair of brackets 22a on the rear of the body, and has a dovetail groove 22b in the front of the body. One end 22c of the dovetail groove 22b is closed, and the other end 22d is open. The back 25, to which the lining 24 is secured, has a dovetail 25a, which is fitted in the dovetail groove 22b of the body 22. A securing piece 28 has a pair of bolt holes 28a and 28b and a projection 28c.

In each brake shoe assembly 5, the dovetail 25a of the back element 25 of the brake shoe 23 is inserted into the dovetail groove 22b of the body 22 from the open end 22d of the dovetail groove. The projection 28c of the securing piece 28 is then inserted into the central portion of the dovetail groove to hold the back element 25 at its end face, and the securing piece is then tightened on the body 22 by bolts 30.

Since the dovetail 25a of the brake shoe 23 is inserted upwards into the dovetail groove 22b of the body 22 and the securing piece 28 is tightened on the body 22 by the bolts 30 to attach the brake shoe to the body, it is not only difficult for a single working person to attach the brake shoe to the body but also there is a danger that the brake shoe is likely to drop off to injure the person when the bolts 30 are pulled out to detach the brake shoe.

SUMMARY OF THE INVENTION

According to the present invention, a securing element is always attached to the body of a disk brake assembly, and the brake shoe of the assembly is supported by the securing element even when a new brake shoe is being attached. For that reason, even a single person can safely attach the brake shoe to the body. The brake shoe does not drop off even if bolts for tightening the securing element piece are pulled out of it.

BRIEF DESCRIPTION OF THE DRAWINGS

FIG. 11 shows the brake shoe assembly of the disk brake of FIG. 8.

DETAILED DESCRIPTION OF THE PRFFERRED EMBODIMENT

An embodiment of the present invention, which is a device for attaching the brake shoe of a disk brake for a railroad car, is hereafter described with reference to FIGS. 1-7.

Figure 1:
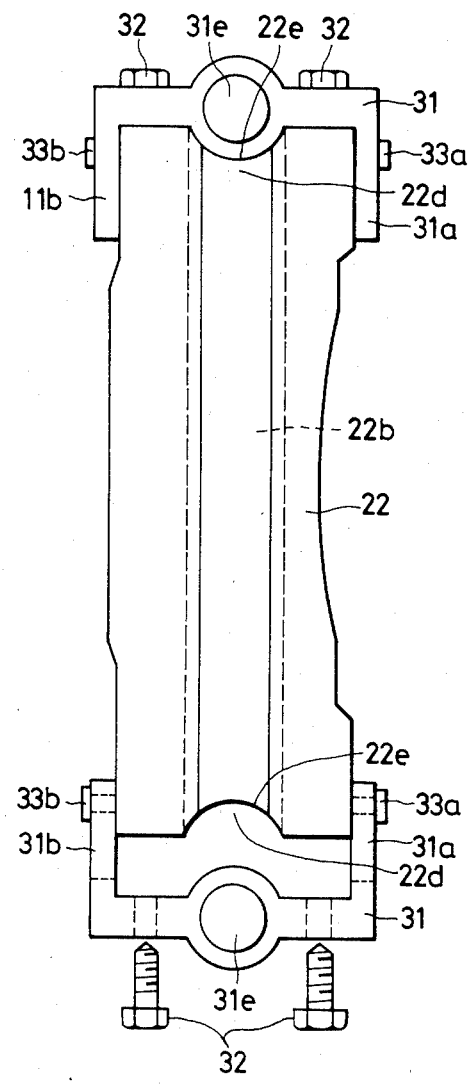
FIG. 1 shows a brake shoe assembly body in according to an embodiment of the present invention.
Figure 2:
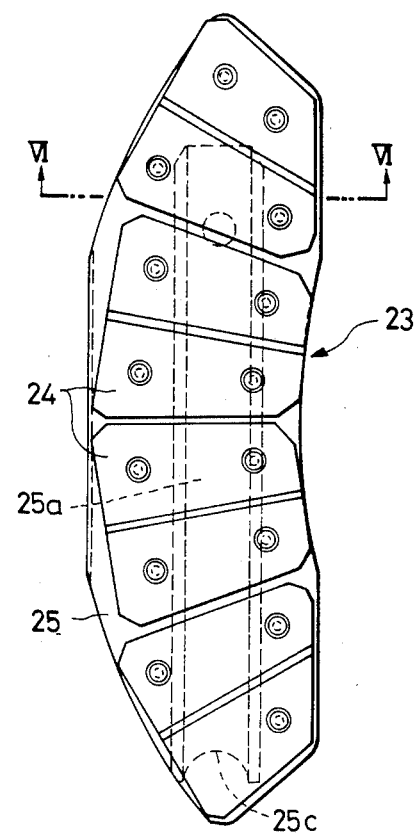
FIG. 2 shows a brake shoe in the embodiment.

In the preferred embodiment, the body 22 of the brake shoe assembly of the disk brake has a dovetail groove 22b on one side of the body and on its other side a bracket 22a, as shown in FIG. 1. Both the ends 22d of the dovetail groove 22b are open. The body 22 has arc-shaped recesses 22e at the open ends 22d.

Figure 3:
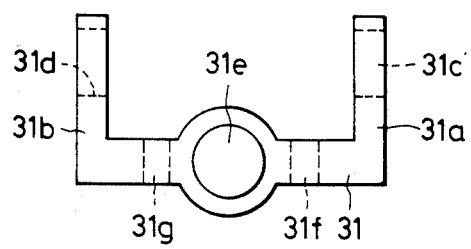
FIG. 3 shows a front view of a securing element.
Figure 6:
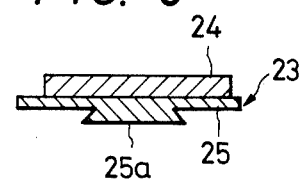
FIG. 6 shows a sectional view along the lines 6—6 in FIG. 2.
Figure 4:
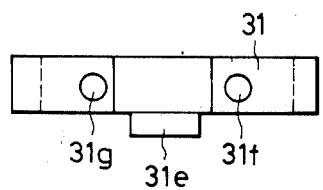
FIG. 4 shows a bottom view of the securing element.
Figure 5:
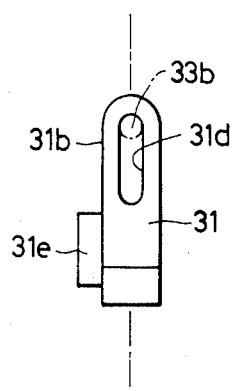
FIG. 5 shows a side view of the securing element.

As shown in FIGS. 3, 4 and 5, securing element 31 has support arms 31a and 31b at both sides thereof. The support arms 31a and 31b have elongate holes 31c and 31d of slender cross section extending in the longitudinal directions of the support arms. An anchoring pin 31e is press-fitted in the securing element 31 and extends transverse to longitudinal directions of the support arms 31a and 31b. The securing piece 31 has a pair of bolt holes 31f and 31g extending along the length of the support arms 31a and 31b and located at both sides of the anchoring pin 31e. Bolts 32 are inserted into the bolt holes 31f and 31g to tighten the securing piece 31 on the body 22. A pair of supoort pins 33a and 33b are inserted into the slender-cross-section holes 31c and 31d of the support arms 31 and 31b, and the tip portions of the support pins are screw-tightened in both the lateral surfaces of the body 22. As a result, the securing piece 31 is supported in such a manner that it can be swung relative to the body 22 and be moved along the slender-cross-section holes 31c and 31d.

Figure 8:
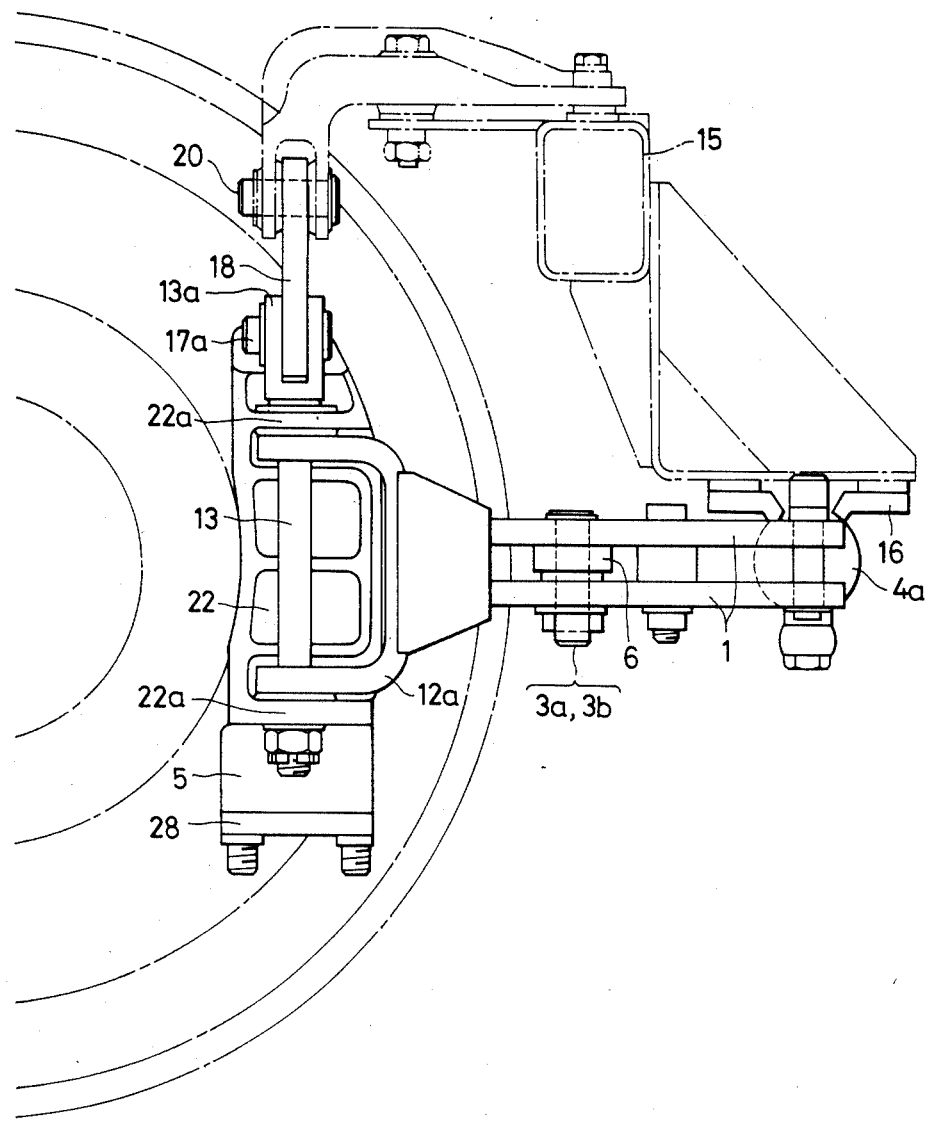
FIG. 8 shows a front view of a conventional disk brake for a railroad car.
Figure 10:
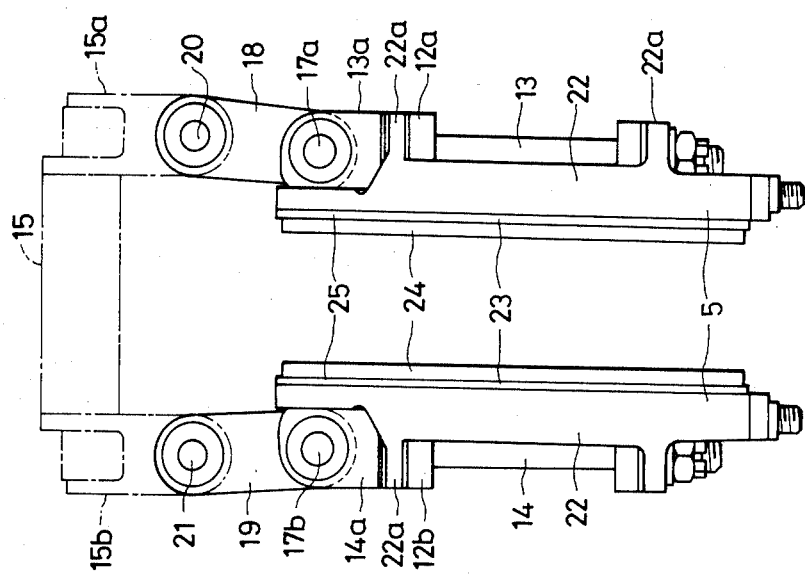
FIG. 10 shows a side view of the disk brake of FIG. 8.
Figure 9:
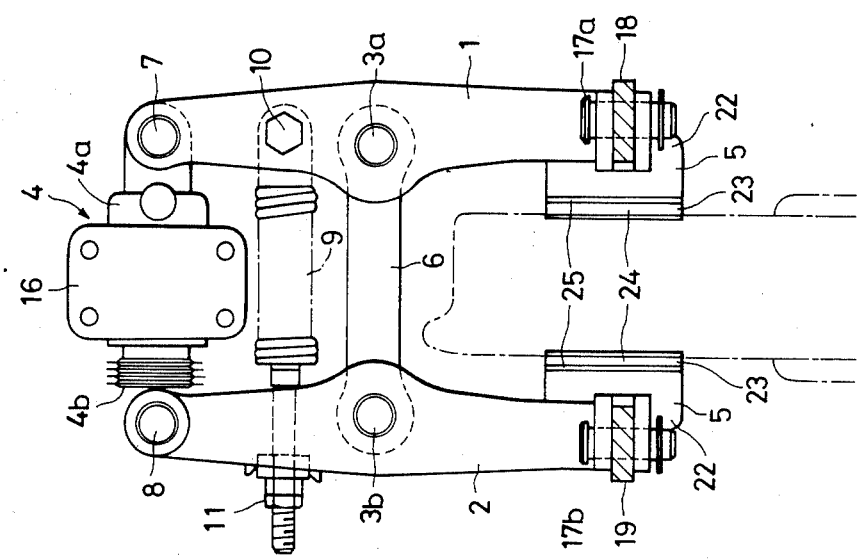
FIG. 9 shows a plan view of the disk brake of FIG. 8.

When the body 22 of the brake shoe assembly is attached to the railroad car, one of the open ends 22d of the dovetail groove 22b is located face-down in the same manner as the conventional disk brake shown in FIG. 8.

As shown in FIG. 1, the securing piece 31 is put in a suspended state by removing the bolts 32.

Figure 7:
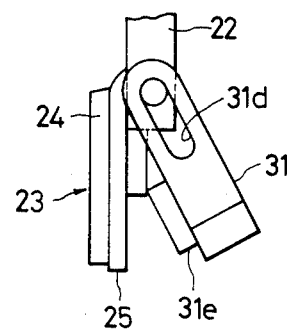
FIG. 7 shows a view for explaining the operation of the embodiment.

As shown in FIG. 7, the securing piece 31 is lightly pushed and inclined by the back element 25 of the brake shoe 23 of the brake shoe assembly in order that the dovetail 25a of the back element 25 is inserted into the dovetail groove 22b of the body 22. After the dovetail 25a is completely inserted into the dovetail groove 22b, the securing piece 31 is swung back to the original position to close the open end 22d of the dovetail groove, and the anchoring pin 31e of the securing piece 31 is fitted in the arc-shaped recess 25c of the back element 25 to keep the brake shoe 23 from dropping off.

The bolts 32 are then inserted into the bolt holes 31f and 31g of the securing piece 31 and tightened in in the body 22 so that the securing piece is moved up in the longitudinal directions of its support arms 31a and 31b along the length of the dovetail groove 22b of the body 22, and the anchoring pin 31e is fitted in the arc-shaped recess 22e of the body. As a result, the brake shoe 23 is firmly mounted on the body 22.

The present invention can also be applied to attach the brake shoe of a disk brake of the floating caliper-shaped member type for a railroad car. In that application, one of the bodies of the brake assemblies of the disk brake is engaged with a piston fitted in a cylinder provided at the rear portion of a caliper shaped member, and the other body is secured to the front portion of the caliper-shaped member.

Although both the ends 22d of the dovetail groove 22b are open in the embodiment described above, one of the ends 22d may be closed.

While the invention has been described in connection to what is presently considered to be the most practical and preferred embodiment(s), it is to be understood that the invention is not limited to the disclosed embodiment, but on the contrary is intended to cover various modifications and equivalent arrangements included within the spirit and scope of the appended claims.

What is claimed is:

1. A device for attaching a brake shoe having a lining and a back element to the body of a brake shoe assembly having a groove extending longitudinally thereof, comprising:
   means for engaging said groove to slidably attach said back element to said body, said means having two ends and a longitudinal axis;
   a securing element proximate one of said ends;
   means for mounting said securing element to said body;
   so as to permit said securing member to be pivoted relative to said body and moved in the direction of the longitudinal axis of said engaging means; and
   means for fastening said securing member to said body while the brake shoe is in use.

2. The device of claim 1 wherein said attaching means is a dovetail formed on said back element, for mating with said groove.

3. The device of claim 2 wherein said securing member has an anchoring pin thereon on which said dovetail rests as the brake is withdrawn from said body.

4. A device for attaching a brake shoe having a lining and a back element to the body of a brake shoe assembly having a groove extending longitudinally thereof, comprising;
   means for engaging said groove to slidably attach said back element to said body, said means having two ends and a longitudinal axis;
   a securing element proximate one of said ends;
   means for mounting said securing element to said body, said mounting means comprising a pair of support arms on said securing member having a slender elongate hole in each of said support arms, and a pin extending through each of said elongate holes whereby said securing member may be pivoted about said pin and move longitudinally of said engaging means; and
   means for fastening said securing member to said body while the brake shoe is in use.

* * * * *